United States Patent [19]

Kluger et al.

[11] Patent Number: 4,981,516

[45] Date of Patent: Jan. 1, 1991

[54] METHINE COLORANTS AND WASHABLE INK COMPOSITIONS CONTAINING METHINE COLORANTS

[75] Inventors: Edward W. Kluger, Pauline; John W. Rekers, Spartanburg; Judy A. Wagner, Taylors, all of S.C.

[73] Assignee: Milliken Research Corporation, Spartanburg, S.C.

[21] Appl. No.: 410,207

[22] Filed: Sep. 21, 1989

Related U.S. Application Data

[63] Continuation-in-part of Ser. No. 139,346, Dec. 29, 1987, abandoned.

[51] Int. Cl.$^5$ .................. C09H 11/02; C07C 67/02
[52] U.S. Cl. ........................... 106/22; 558/403; 560/251; 560/252
[58] Field of Search .................. 106/22; 558/403; 560/251, 252

[56] References Cited

U.S. PATENT DOCUMENTS

| | | | |
|---|---|---|---|
| 3,846,141 | 11/1974 | Ostergren et al. | 106/22 |
| 4,167,510 | 9/1979 | Brendle | 260/174 |
| 4,703,113 | 11/1987 | Baxter et al. | 534/796 |
| 4,877,411 | 10/1989 | Hines et al. | 8/604 |

Primary Examiner—Karl Group
Assistant Examiner—Helen Klemanski
Attorney, Agent, or Firm—Timothy J. Monahan; H. William Petry

[57] ABSTRACT

A washable ink composition is provided which is an aqueous mixture containing water soluble, ester-terminated, poly(alkyleneoxy)-substituted methine colorant of the formula:

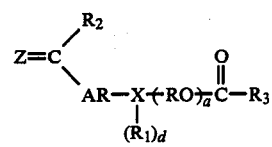

wherein: AR is an unsubstituted or substituted aromatic or hetero-aromatic group; X is nitrogen or oxygen; R is unsubstituted or substituted straight or branched alkylene of 2-4 carbons or mixtures thereof; $R_1$ is H or an unsubstituted or substituted alkyl, cycloalkyl or phenyl moiety containing one to about 10 carbons, or a group of the formula:

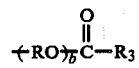

wherein: $R_3$ is H or alkyl of one to about ten carbons, and d is zero when X is oxygen and one when X is nitrogen; $R_2$ is hydrogen or alkyl of one to about five carbons; a and b are each an integer independently selected from one to about forty wherein a+b is an integer of from about 6 to about 80; and Z is a divalent vinylic carbon atom which is covalently bonded to a group or moiety including any of cyano, vinyl carbon, sulfide, sulfoxide, sulfone, allylic oxygen, thiocyano, or carbonyl which is not part of an amide, carboxylic acid or carboxylic acid salt moiety.

36 Claims, No Drawings

METHINE COLORANTS AND WASHABLE INK COMPOSITIONS CONTAINING METHINE COLORANTS

This is a continuation-in-part of application U.S. Ser. No. 07/139,346 filed Dec. 29, 1987 now abandoned.

The present invention relates to methine colorants and to washable ink compositions containing methine colorants. More particularly, the present invention relates to water soluble, ester-terminated, polyalkyleneoxy-substituted methine colorants and to water-based ink compositions containing such colorants having improved washability and stain resistance characteristics.

Washability and resistance to staining are characteristics that may be highly desirable in a wide variety of end use applications for inks, especially in applications designed for young children. Such applications may include, for instance, water colors, inks for "nib-type" pens as well as felt-type and wick markers, stamp pads, recording pens and a wide variety of other applications that will be readily apparent to those skilled in this art.

Conventional, water-based inks designed, for instance, for use in marker pens sold primarily for use by young children may typically consist of very fine pigment dispersions in aqueous media which may contain a minor amount of a solvent such as glycol, polyols, polyoxyethers, or other functionalized alcohols and a dispersing agent. Alternatively, such marking ink compositions may be comprised of conventional acid, e.g., dyes containing sulfonic acid groups or their corresponding salts, dyestuffs in an aqueous glycerine solution.

Such conventional ink compositions are characterized by certain serious disadvantages, especially where use by children is contemplated. Thus, such inks may stain the skin and clothing of the user and may not be easily removable using conventional procedures for washing hands or laundering clothing. Certain low molecular weight acid dyes may not be desirable for use in ink compositions since they are suspected carcinogens. Many of the solvents conventionally found in such ink compositions may also have an objectionable odor, and they may also be toxic, (upon inhalation or skin contact), and are therefore undesirable for use in inks for those reasons as well (see Polymers, Paint, Color Journal, Vol. 177, No. 4192, 1987). Furthermore, many of the conventional ink compositions may not be stable upon storage because the pigment or dyestuff may precipitate from the ink composition with the passage of time.

Accordingly, the ink compositions of the present invention may overcome all or many of the disadvantages found in conventional ink compositions. In particular the ink compositions of the invention may exhibit improved resistance to staining of both skin and fabrics including one or more of cotton, wool, acetate, polyester, polyamide, acrylics, silk and viscose so that all, or virtually all of the colorant may be removed from skin by means of conventional soap and water washing and from clothing using normal laundering techniques. Furthermore, the ink compositions of the present invention have exceptional tinctorial power, exhibit superior brightness, and may be less toxic to humans due to the relatively high molecular weight of the colorant and because other solvents may not necessarily be present in the ink compositions.

The ink compositions of the present invention exhibit excellent brilliance, intensity and clarity of color especially when used on paper substrates. In addition, the present ink compositions may be applied smoothly and uniformly from a typical writing or marking instrument onto a wide variety of substrate surfaces. Once applied to a given substrate the ink compositions are also not undesirably transferred from the intended substrate such as paper to other objects such as clothing or skin by, for instance, sublimation as may occur with conventional inks even after drying because they contain lower molecular weight, more volatile colorants.

Accordingly, the present invention provides:

A washable ink composition which comprises an aqueous mixture of a alkyleneoxy-substituted methine colorant of the formula:

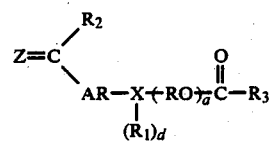

wherein: AR is an unsubstituted or substituted aromatic or hetero-aromatic group; X is selected from nitrogen or oxygen; R is unsubstituted or substituted straight or branced alkylene of 2-4 carbons or mixtures thereof; $R_1$ is selected from or an unsubstituted or substituted alkyl cycloalkyl or phenyl moiety containing one to about 10 carbons, or a group of the formula

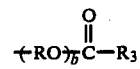

wherein $R_3$ is or alkyl of one to about ten carbons, and d is zero when X is oxygen and one when X is nitrogen; $R_2$ is hydrogen or alkyl of one to about five carbons; a and b are each an integer independently selected from one to about forty wherein a+b is an integer of from about 6 to about 80 and z is a divalent vinylic carbon atom which is covalently bonded to a group or moiety selected from cyano, vinyl carbon, sulfide, sulfoxide, sulfone, allylic oxygen, thiocyano, or carbonyl which is not part of an amide, carboxylic acid or carboxylic acid salt moiety.

It is to be understood that in the structural formula set forth above and in the claims the representation of the alkylene oxide portion of the molecule may include, e.g., ethylene oxide homopolymers as well as copolymers of ethylene oxide and higher order alkoxydes such as propylene oxide especially random copolymers and block copolymers.

The present invention also relates to certain methine colorants of the type set forth in formula I above wherein all of the values given for the various substituents are as set forth above exept that the sum of a+b may be from about 6 to about 80. In addition to their utility for use in making washable ink compositions the methine colorants may be useful in a wide variety of other end use applications, for instance as reactive coloring agents for polyurethanes and other polymers, as colorants for certain thermoplastic polymers, such as polyolefins, polyesters, etc., as markers for agricultural chemicals and as fugitive tints for textile applications.

In general methine colorants are well known chemical compounds having a wide range of end use applications including, for instance, their uses as dyestuffs in coloring cellulose triacetate, polyamide, polyester, and polyurethane substrates. More recently they have been suggested for use as U.V. absorbers which impart ultraviolet screening properties to numerous water-soluble, ester-terminated, polyalkyleneoxy-substituted methine colorants been disclosed or suggested. Neither has there been any suggestion in the art of washable ink compositions containing such methine colorants.

Colorants made of polyalkyleneoxy-substituted chromophores are also known and have been disclosed as having utility, for instance as fugitive tints in coding fabrics of different types for identification purposes prior to textile processing.

Such compounds have, for instance, been disclosed in U.S. Pat. No. 3,157,663 to Kuhn. While such colorants are water soluble and homogeneous, they are not suitable for washable ink compositions for several reasons. The corresponding colorants of Kuhn, as mentioned above, are used primarily to tint fabric substrates; therefore, they are usually of very high molecular weight units containing as many as 100 to 200 ethylene oxide units. Such compounds may be in a solid phase at standard temperatures and pressure and may have poor tinctorial properties (very low color strength). Since an aqueous ink composition requires water as the solvent for the polymeric colorant as well as any potential other additives, compositions as disclosed above require extremely high loadings of solid polymeric colorants to be dissolved in water. This inherent property leads to ink compositions of polymeric colorants with very little water and exceedingly high concentrations of polymeric colorants which in turn leads to ink compositions of unacceptably high working viscosities. In many cases, an ink composition cannot even be prepared with high enough color strength to be useful in the washable marker area of the present invention. The ink compositions of the present invention, by contract contain colorants as defined above, such that the ink has high color strength and low solution viscosity (required in ink compositions) while maintaining its washability and non-staining characteristics. A viscosity of from 6 to about 1 centipoises is desirable. Preferably the viscosity may be less than about 5 centipoises. Viscosity is measured by a Model LVT Brookfield viscosimeter, UL adapter at 60 RPM's.

A typical preferred ink composition of the present invention is compried of from about 40 percent by weight to about 80 percent by weight of water; from about 10 percent by weight to about 50 percent by weight of alkyleneoxy-substituted methine colorant containing from about 10 percent by weight to about 50 percent by weight of polyalkylene oxide units. The polymeric colorants selected for he washable ink compositions of the present invention contain from about 5 percent by weight to 40 percent by weight of polyalkylene oxide; wherein the alkylene oxide is preferably ethylene oxide.

In addition to the ester-terminated, polyalkyleneoxy-substituted methine colorant component and water which serves as a solvent for the ink composition, a wide variety of additives may also be employed to impart specific properties to the ink composition in either the wet or dried state. Some common additives which may be present include, for example, organic components which are well known in the art and which function as humectants, biocides, and chelatings agents.

Any humectant having water solubility can be used in the ink composition of this invention and where the composition is employed in a marker pen; for instance, it may serve to substantially prevent or minimize the marker tip from drying. Several examples of humectants commercially used are glycerine, diethylene glycol and polyethylene glycols, and sorbitol. The percent by weight of humectants can vary but typically about 5 to about 20 percent by weight of the ink composition is used.

A biocide or bactericide can be added to improve shelf-life of the ink composition. Biocides which are particularly useful in the composition are Nuosept and both methyl and propyl parasepts. The biocide retards the growth of micro-organisms which may degrade the ink and can be eliminated if it is not necessary to inhibit the growth of bacteria. The biocide therefore adds to the shelf-life of the ink composition. In general, the percentage by weight of biocide can vary greatly depending on the chemical nature of biodice, however, from 0.02 to about 0.5 percent by weight have been found to be generally useful. Some commercially available biocides that can be utilized are as follows: Troysan Polyphase AF-1, Troysan 174, Troysan 142, Cosan 101, Amical 48, Tektamer 38 A.D., Dowicil 75, Metasol TK 100 Dispersion W, Omacide 50, Acticide APA, Domiphen Bromide, Benzalonium Chloride, Cetyl Pyridium Chloride, Kathon CG/ICP/886 MW 1.5% LX, Euxyl K100, and Glutaraldehyde.

Various chelating agents may be provided in the ink composition to improve shelf-life. Thus, for instance, EDTA is a chelating agent which complexes metal ions such as iron, zinc, magnesium, etc. and prevents the precipitation of these metal ions. The percentage by weight of metal chelating can vary greatly, however, generally from 0.1 to about 0.5 percent by weight of EDTA (sodium salt) on the weight of the total ink composition can be employed to prevent the formation of water insoluble carbonate salts when the ink compositions is exposed to ambient air which contains carbon dioxide.

Another aspect of shelf-life is the maintenance of the polyalkyleneoxy colorant and this is extended by maintaining the pH of the ink at some value close to about 7.0. The pH can go below about 6.5 without loss of activity. However, values of pH above 8.0 can severely degrade the colorant especially if elevated temperatures are involved. Accordingly, the pH of the ink composition is adjusted to from about 5.5 to about 8.0 and preferably from about 6.5 to about 7.5.

As mentioned above, the ink compositions of the present invention are characterized by significantly reduced staining of fabrics. Fabric staining may be determined by measuring the delta E*ab value of the residual colorant stain. This delta E*ab value is directly related to fabric staining after laundering. The numberical value of delta E*ab as is determined in this invention can vary from 0 to about 10; preferably from 0 to about 5.

In addition, the ink compositions also are characterized by significantly reduced staining of skin. Skin staining may be measured by rating the residual skin stain after washing the hands with soap and water. The numerical value for hand staining, on a scale of zero to ten, as determined in this invention can vary from 0 to about 2; preferably from 0 to about 1.

EXPERIMENTAL SECTION

The following examples serve to illustrate the subject matter of the present invention and are not to be construed as limiting the scope of the invention. All parts and percentages which are set forth are by weight unless otherwise indicated. The following abbreviations are utilized in the following tables Et=ethyl; Me=-methyl; EO=ethylene oxide unit; PO=propylene oxide; Ac=Acetate; and DiAc=Diacetate.

EXAMPLE 1

One hundred and nine grams of p-formylaniline 20 EO diacetate (prepared according to the procedure given in U.S. Pat. No. 4,658,064), 12.8 grams of ethyl cyanoacetate and a trace of glycine catalyst were charged into a 250 milliliter three necked flask equipped with thermometer, reflux condenser, mechanical stirrer, and heating mantle.

This mixture was heated to 80° C. until no more aldehyde absorbance could be detected by UV spectrum. This took about four hours of heating. The resulting mixture was dissolved in methylene chloride and washed with water three times. The methylene chloride solution was then dried over magnesium sulfate and filtered into a 500 milliliter round bottom flask. The solution was then stripped of all volatiles under vacuum and the resulting yellow liquid was used without further purification. The structure of this resultant compound is set forth in entry 1 of Table I. Entries 2 through 25 were also prepared using the same general procedure set forth above.

TABLE I
YELLOW POLYMER METHINE COLORANTS
(METHYL ESTER)

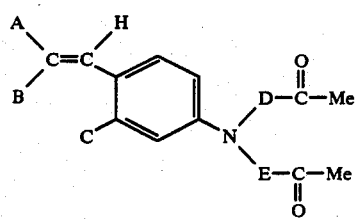

| ENTRY | A | B | C | DE |
|---|---|---|---|---|
| 1 | CO$_2$Et | CN | H | 20 |
| 2 | CO$_2$Et | CN | H | 15 |
| 3 | CO$_2$Et | CN | H | 10 |
| 4 | CO$_2$Et | CN | H | 5 |
| 5 | CO$_2$Et | CN | H | 22 |
| 6 | CO$_2$Et | CN | H | 24 |
| 7 | CO$_2$Et | CN | H | 27 |
| 8 | CO$_2$Et | CN | H | 90 |
| 9 | CO$_2$Et | CN | H | 2/15/5 |
| 10 | CO$_2$Et | CN | H | 2/15/20 |
| 11 | CO$_2$Et | CN | H | 2/2/16 |
| 12 | CO$_2$Et | CN | H | 2/2/26 |
| 13 | CO$_2$Me | CN | H | 20 |
| 14 | CO$_2$Et | CN | Me | 10 |
| 15 | CO$_2$Et | CN | Me | 20 |
| 16 | CO$_2$Et | CN | Cl | 10 |
| 17 | CO$_2$Et | CN | Cl | 20 |
| 18 | CO$_2$Et | CN | OMe | 20 |
| 19 | CN | CN | H | 10 |
| 20 | CN | CN | H | 20 |
| 21 | CN | CN | Me | 10 |
| 22 | CN | CN | Me | 20 |
| 23 | CN | CN | Cl | 10 |
| 24 | CN | CN | Cl | 20 |

TABLE I-continued
YELLOW POLYMER METHINE COLORANTS
(METHYL ESTER)

| ENTRY | A | B | C | DE |
|---|---|---|---|---|
| 25 | CN | CN | Me | 20 |

*center number = PO

EXAMPLE 2

Two hundred and twenty grams of p-formylaniline 20 EO diacetate intermediate and 36 grams of 50% sodium hydroxide were charged into a 500 milliliter three necked flask equipped with thermometer, reflux condenser, mechanical stirrer and heating mantle. The reaction contents were heated at 60° C. until an IR spectrum of the mixture showed no acetate groups on the intermediate.

The reaction mixture was then neutralized of excess base with dilute hydrochloric acid and dissolved in methylene chloride. The methylene chloride layer was then filtered into a 500 milliliter round bottom flask and stripped under vacuum.

The corresponding p-formylaniline 20 EO intermediate was then heated with 80 grams of propionic anhydride and 1 drop of 1-methyl imidazole catalyst in a 500 milliliter at 85°-90° C. until an IR spectrum of the reaction mixture showed no more hydroxyl groups present and the appearance of propionate groups on the intermediate. The mixture was then transferred to a 500 milliliter round bottom flask and was stripped of the excess propionic anhydride under vacuum.

One hundred and ten grams of p-formylaniline 20 EO dipropionate (as described above), 12.8 grams of ethyl cyanoacetate and a trace of glycine catalyst were charged into a 250 milliliter three necked flask equipped with thermometer, reflux condenser, mechanical stirrer, and heating mantle.

This mixture was heated to 80° C. until no more aldehyde absorbance could be detected by UV spectrum. This took about four hours of heating. The resulting mixture was dissolved in methylene chloride and washed with water three times. The methylene chloride solution was then dried over magnesium sulfate and filtered into a 500 milliliter round bottom flask. The solution was then stripped of all volatiles under vacuum and the resulting yellow liquid was used without further purification. The structure of this resultant compound is set forth in entry 1 of Table II. Entries 2 through 18 were also prepared using the same general procedure set forth above.

TABLE II

SUBSTITUTED ESTERS OF POLYMERIC METHINE COLORANTS (YELLOW)

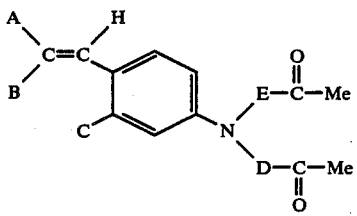

| ENTRY | A | B | C | DE | F |
|---|---|---|---|---|---|
| 1 | CO₂Et | CN | H | 20 | Et |
| 2 | CO₂Et | CN | H | 10 | Et |
| 3 | CO₂Et | CN | Me | 20 | Et |
| 4 | CO₂Et | CN | Me | 10 | Et |
| 5 | CO₂Et | CN | Cl | 10 | Et |
| 6 | CO₂Et | CN | Cl | 20 | Et |
| 7 | CO₂Et | CN | OMe | 20 | Et |
| 8 | CO₂Me | CN | H | 20 | Et |
| 9 | CN | CN | H | 20 | Et |
| 10 | CN | CN | Cl | 20 | Et |
| 11 | CN | CN | Me | 20 | Et |
| 12 | CO₂Et | CN | H | 10 | CHMe₂ |
| 13 | CO₂Et | CN | H | 20 | CHMe₂ |
| 14 | CO₂Et | CN | Me | 20 | CHMe₂ |
| 15 | CO₂Me | CN | Cl | 20 | CHMe₂ |
| 16 | CN | CN | H | 20 | CHMe₂ |
| 17 | CN | CN | Me | 20 | CHMe₂ |
| 18 | CN | CN | Me | 20 | CHMe₂ |

EXAMPLE 3

One hundred and seventeen grams of 6-formyl-2,2,4-trimethyltetrahydroquinoline 20 EO diacetate intermediate (prepared according to the general procedure given in U.S. Pat. No. 4,658,064), 12.8 grams of ethyl cyanoacetate and a trace of glycine catalyst were charged into a 250 milliliter three necked flask equipped with thermometer, reflux condenser, mechanical stirrer, and heating mantle.

This mixture was heated to 80° C. until no more aldehyde absorbance could be detected by UV spectrum. This took about four hours of heating. The resulting mixture was dissolved in methylene chloride and washed with water three times. The methylene chloride solution was then dried over magnesium sulfate and filtered into a 500 milliliter round bottom flask. The solution was then stripped of all volatiles under vacuum and the resulting yellow liquid was used without further purification. The structure of this resultant compound is set forth in entry 1 of Table III. Entries 2 through 20 were also prepared using the same general procedure set forth above.

TABLE III

POLYMERIC QUINOLINE SUBSTITUTED METHINES (YELLOWS)

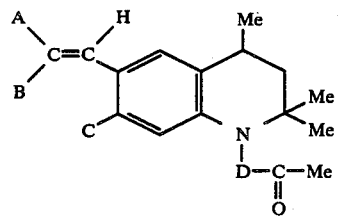

| ENTRY | A | B | C | D |
|---|---|---|---|---|
| 1 | CO₂Et | CN | H | 20 EO |
| 2 | CO₂Et | CN | H | 27 EO |
| 3 | CO₂Et | CN | H | 15 EO |
| 4 | CO₂Et | CN | H | 12 EO |
| 5 | CO₂Et | CN | H | 10 EO |
| 6 | CO₂Me | CN | H | 10 EO |
| 7 | CO₂Me | CN | H | 20 EO |
| 8 | CN | CN | H | 10 EO |
| 9 | CN | CN | H | 20 EO |
| 10 | CN | CN | H | 27 EO |
| 11 | CO₂Et | CN | Me | 10 EO |
| 12 | CO₂Et | CN | Me | 15 EO |
| 13 | CO₂Et | CN | Me | 20 EO |
| 14 | CO₂Et | CN | Me | 27 EO |
| 15 | CN | CN | Me | 15 EO |
| 16 | CN | CN | Me | 20 EO |
| 17 | CN | CN | Me | 27 EO |
| 18 | CO₂Et | CN | Cl | 12 EO |
| 19 | CO₂Et | CN | Cl | 20 EO |
| 20 | CO₂Et | CN | Cl | 27 EO |

EXAMPLE 4

One hundred and twenty-two grams of p-formylphenol (Eastman) 880 grams of toluene, and 6 grams of potassium hydroxide flake catalyst were charged to a 1 gallon autoclave. The autoclave was purged with nitrogen three times and heated to 120° C. A total of 880 grams of ethylene oxide was then added to the autoclave under nitrogen pressure controlling the exotherm below 125° C. and heated for an additional 4 hours at this temperature. The solution was then stripped of toluene under vacuum to give the corresponding p-formylphenol 20 EO intermediate.

Two hundred and twenty grams of acetic anhydride, 1002 grams of the p-formylphenol 20 EO intermediate and 20 drops of the 1-methyl-imidazole catalyst was added to a two liter beaker and heated at 85°–90° C. until the reaction mixture an IR spectrum showed no free alcohol bands. The contents of the beaker were then transferred to a 2000 milliliter round bottom flask and stripped under vacuum to remove the excess acetic anhydride.

One hundred and one grams of p-formylphenol 20 EO acetate (prepared according to the procedure given above), 12.8 grams of ethyl cyanoacetate and a trace of glycine catalyst were charged into a 250 milliliter three necked flask equipped with thermometer, reflux condenser, mechanical stirrer, and heating mantle. This mixture was heated to 80° C. until no more aldehyde absorbance could be detected by UV spectrum. This took about four hours of heating. The resulting mixture was dissolved in methylene chloride and washed with water three times. The methylene chloride solution was then dried over magnesium sulfate and filtered into a 500 milliliter round bottom flask. The solution was then stripped of all volatiles under vacuum and the resulting product liquid was used without further purification. The structure of this resultant compound is set forth in entry 1 of Table IV. Entries 2 through 11 were also prepared using the same general procedure set forth above.

EXAMPLE 5

One hundred and nine grams of p-formylaniline 20 EO diacetate (prepared according to the procedure given in U.S. Pat. No. 4,658,064), 15.8 grams of 3-methyl-1-phenyl pyrazole and 300 milliliters of toluene were charged into a 500 milliliter three necked flask equipped with thermometer, reflux condenser, Dean Stark trap, mechanical stirrer, and heating mantle.

This mixture was heated to reflux until no more aldehyde absorbance could be detected by UV spectrum. This took about four hours of heating. The resulting mixture was dissolved in methylene chloride and washed with water three times. The methylene chloride solution was then dried over magnesium sulfate and filtered into a 500 milliliter round bottom flask. The solution was then stripped of all volatiles under vacuum and the resulting orange liquid was used without further purification. The structure of this resultant compound is set forth in entry 1 of Table V. Entries 2 through 14 were also prepared using the same general procedure set forth above.

TABLE V
POLYMERIC PYRAZOLE METHINES

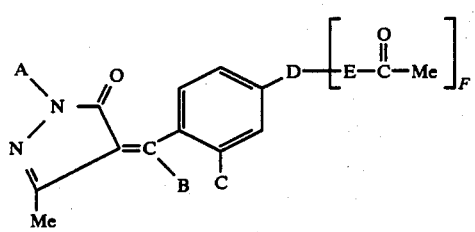

| ENTRY | A | B | C | D | E | F | COLOR |
|---|---|---|---|---|---|---|---|
| 1 | C6H5 | H | H | N | 20 | 2 | Orange |
| 2 | C6H5 | H | H | N | 30 | 2 | Orange |
| 3 | C6H5 | H | H | N | 10 | 2 | Orange |
| 4 | C6H5 | H | Me | N | 10 | 2 | Orange |
| 5 | C6H5 | H | Me | N | 20 | 2 | Orange |
| 6 | C6H5 | H | Me | N | 30 | 2 | Orange |
| 7 | C6H5 | Me | H | N | 10 | 2 | Orange |
| 8 | C6H5 | Me | H | N | 20 | 2 | Orange |
| 9 | H | H | H | N | 10 | 2 | Orange |
| 10 | H | H | H | N | 20 | 2 | Orange |
| 11 | C6H5 | H | H | O | 10 | 1 | Yellow |
| 12 | C6H5 | H | H | O | 20 | 1 | Yellow |
| 13 | Me | H | H | O | 20 | 1 | Yellow |
| 14 | C6H5 | Me | H | O | 20 | 1 | Yellow |

EXAMPLE 6

One hundred and seventeen grams of 6-formyl-2,2,4-trimethyltetrahydroquinoline 20 EO diacetate intermediate (prepared according to the general procedure given in U.S. Pat. No. 4,658,064), 15.8 grams of 3-methyl-1-phenyl pyrazole and a 300 milliliters of toluene were charged into a 500 milliliter three necked flask equipped with thermometer, reflux condenser, Dean Stark trap, mechanical stirrer, and heating mantle.

This mixture was heated to 80° C. until no more aldehyde absorbance could be detected by UV spectrum. This took about four hours of heating. The resulting mixture was dissolved in methylene chloride and washed with water three times. The methylene chloride solution was then dried over magnesium sulfate and filtered into a 500 milliliter round bottom flask. The solution was then stripped of all volatiles under vacuum and the resulting orange liquid was used without further purification. The structure of this resultant compound is set forth in entry 1 of Table VI. Entries 2 through 8 were also prepared using the same general procedure set forth above.

TABLE VI
SUBSTITUTED POLYMERIC QUINOLINE METHINES

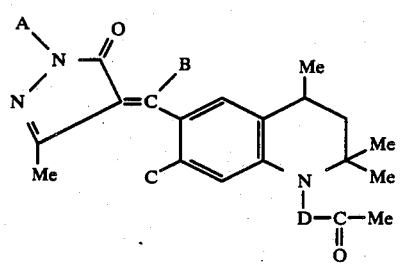

| ENTRY | A | B | C | D | COLOR |
|---|---|---|---|---|---|
| 1 | C6H5 | H | H | 20 | Orange |
| 2 | C6H5 | H | H | 27 | Orange |
| 3 | C6H5 | H | H | 10 | Orange |
| 4 | C6H5 | H | Me | 10 | Orange |
| 5 | C6H5 | H | Me | 20 | Orange |
| 6 | C6H5 | H | Me | 27 | Orange |
| 7 | H | H | H | 10 | Orange |
| 8 | H | H | H | 20 | Orange |

EXAMPLE 7

One hundred and nine grams of p-formylaniline 20 EO diacetate (prepared according to the procedure given in U.S. Pat. No. 4,658,064), 14.6 grams of 1,3-indandione, and 300 milliliters of toluene were charged into a 500 milliliter three necked flask equipped with thermometer, reflux condenser, Dean Stark trap, mechanical stirrer, and heating mantle.

This mixture was heated to reflux until no more water condensed in the trap which took about four hours of heating. The resulting mixture was dissolved in methylene chloride and washed with water three times. The methylene chloride solution was then dried over magnesium sulfate and filtered into a 500 milliliter round bottom flask. The solution was then stripped of all volatiles under vacuum and the resulting orange brown liquid was used without further purification. The structure of this resultant compound is set forth in entry 1 of Table VII. Entries 2 through 6 were also prepared using the same general procedure set forth above.

TABLE VII
POLYMERIC INDANDIONE METHINES

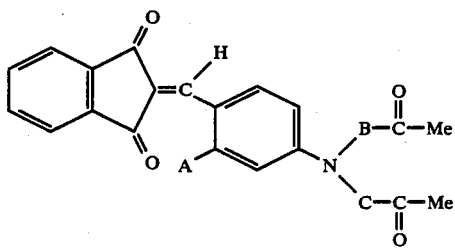

| ENTRY | A  | BC | COLOR  |
|-------|----|----|--------|
| 1     | H  | 20 | Orange |
| 2     | H  | 10 | Orange |
| 3     | Me | 10 | Orange |
| 4     | Me | 20 | Orange |
| 5     | Cl | 10 | Orange |
| 6     | Cl | 20 | Orange |

EXAMPLE 8

One hundred and nine grams of p-formylaniline 20 EO diacetate intermediate, 19.9 grams of 6-chloro-4-methyl-3(2)-thianaphthalenone (Hoechst), and 300 milliliters of toluene were charged into a 500 milliliter three necked flask equipped with thermometer, reflux condenser, Dean Stark trap, mechanical stirrer, and heating mantle.

This mixture was heated to reflux until no more water condensed in the trap which took about eight hours of heating. The resulting mixture was dissolved in methylene chloride and washed with water three times. The methylene chloride solution was then dried over magnesium sulfate and filtered into a 500 milliliter round bottom flask. The solution was then stripped of all volatiles under vacuum and the resulting orange liquid was used without further purification. The structure of this resultant compound is set forth in entry 1 of Table VIII. Entries 2 through 8 were also prepared using the same general procedure set forth above.

TABLE VIII
HETEROAROMATIC POLYMERIC METHINE COLORANTS

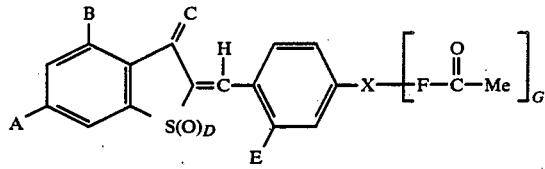

| EN-TRY | A  | B  | C     | D | E  | X | F     | G | COLOR       |
|--------|----|----|-------|---|----|---|-------|---|-------------|
| 1      | Me | Cl | O     | 0 | H  | N | 20 EO | 2 | Orange      |
| 2      | H  | H  | O     | 2 | Me | N | 20 EO | 2 | Orange      |
| 3      | H  | H  | O     | 2 | Cl | N | 20 EO | 2 | Orange      |
| 4      | H  | H  | O     | 2 | H  | N | 20 EO | 2 | Orange      |
| 5      | H  | H  | (CN)2 | 0 | H  | N | 20 EO | 2 | Blue        |
| 6      | H  | H  | (CN)2 | 2 | H  | N | 27 EO | 2 | Blue        |
| 7      | H  | H  | (CN)2 | 2 | Me | N | 27 EO | 2 | Blue-Green  |
| 8      | H  | H  | O     | 2 | H  | O | 20 EO | 1 | Yellow      |

EXAMPLE 9

One hundred and nine grams of p-formylaniline 20 EO diacetate intermediate, 16.8 grams of 1-phenylenthylidenemalonitrile (prepared according to JACS 65,991 (1943)), and 300 milliliters of toluene were charged into a 500 milliliter three necked flask equipped with thermometer, reflux condenser, Dean Stark trap, mechanical stirrer, and heating mantle.

This mixture was heated to reflux until no more water condensed in the trap which took about four hours of heating. The resulting mixture was dissolved in methylene chloride and washed with water three times. The methylene chloride solution was then dried over magnesium sulfate and filtered into a 500 milliliter round bottom flask. The solution was then stripped of all volatiles under vacuum and the resulting red liquid was used without further purification. The structure of this resultant compound is set forth in entry 1 of Table IX. Entries 2 through 11 were also prepared using the same general procedure set forth above.

TABLE IX
AROMATIC POLYMERIC METHINE COLORANTS

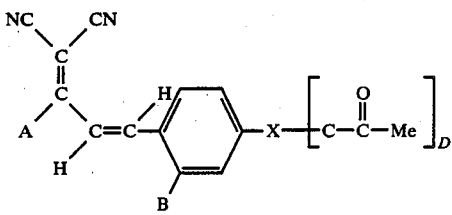

| EN-TRY | A | B  | X | C(EO) | D | COLOR  |
|--------|---|----|---|-------|---|--------|
| 1      |  | H  | N | 20    | 2 | Red    |
| 2      |  | Me | N | 20    | 2 | Red    |
| 3      |  | Cl | N | 20    | 2 | Orange |
| 4      | 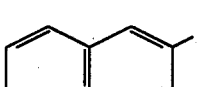 | H  | N | 20    | 2 | Red    |
| 5      | 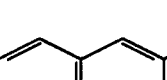 | Me | N | 20    | 2 | Red    |
| 6      |  | H  | N | 20    | 2 | Red    |
| 7      |  | H  | N | 20    | 2 | Red    |

TABLE IX-continued
AROMATIC POLYMERIC METHINE COLORANTS

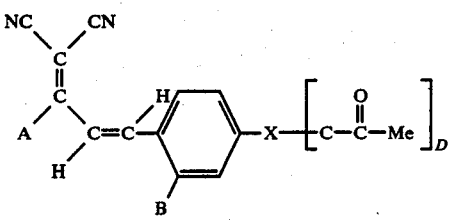

| EN-TRY | A | B | X | C(EO) | D | COLOR |
|---|---|---|---|---|---|---|
| 8 | (5-methyl-thiophene) | | Me | N | 20 | 2 | Red |
| 9 | (chloro-methyl-thiophene) | | H | N | 20 | 2 | Red |
| 10 | (phenyl) | | H | O | 20 | 1 | Orange |
| 11 | (methyl-thiophene) | | H | O | 20 | 1 | Orange |

EXAMPLE 10

One hundred and nine grams of p-formylaniline 20 EO diacetate, 18.5 grams of 3-cyano-4-phenyl-2(H)furanone (prepared according to U.S. Pat. No. 3,468,912), and 300 milliliters of toluene were charged into a 500 milliliter three necked flask equipped with thermometer, reflux condenser, Dean Stark trap, mechanical stirrer, and heating mantle.

This mixture was heated to reflux until no more water condensed in the trap which took about four hours of heating. The resulting mixture was dissolved in methylene chloride and washed with water three times. The methylene chloride solution was then dried over magnesium sulfate and filtered into a 500 milliliter round bottom flask. The solution was then stripped of all volatiles under vacuum and the resulting violet liquid was used without further purification. The structure of this resultant compound is set forth in entry 1 of Table X. Entries 2 through 4 were also prepared using the same general procedure set forth above.

TABLE X
POLYMERIC FURANONE METHINE COLORANTS

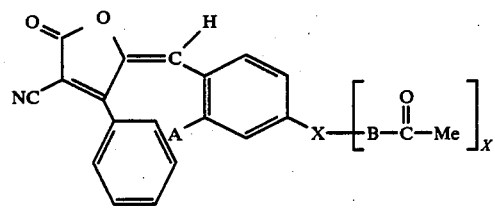

| ENTRY | A | B | X | C | COLOR |
|---|---|---|---|---|---|
| 1 | H | 20 | N | 2 | Violet |
| 2 | Me | 20 | N | 2 | Violet |
| 3 | Cl | 20 | N | 2 | Violet |
| 4 | H | 20 | O | 1 | Yellow |

EXAMPLE 11

One hundred and seventeen grams 6-formyl-2,2,4-trimethyltetrahydroquinoline 20 EO acetate intermediate, 18.5 grams of 3-cyano-4-phenyl-2(H)furanone (prepared according to U.S. Pat. No. 3,468,912), and 300 milliliters of toluene were charged into a 500 milliliter three necked flask equipped with thermometer, reflux condenser, Dean Stark trap, mechanical stirrer, and heating mantle.

This mixture was heated to reflux until no more water condensed in the trap which took about four hours of heating. The resulting mixture was dissolved in methylene chloride and washed with water three times. The methylene chloride solution was then dried over magnesium sulfate and filtered into a 500 milliliter round bottom flask. The solution was then stripped of all volatiles under vacuum and the resulting violet liquid was used without further purification. The structure of this resultant compound is set forth in entry 1 of Table XI. Entries 2 through 5 were also prepared using the same general procedure set forth above.

TABLE XI
POLYMERIC QUINOLINE FURANONE METHINE COLORANTS

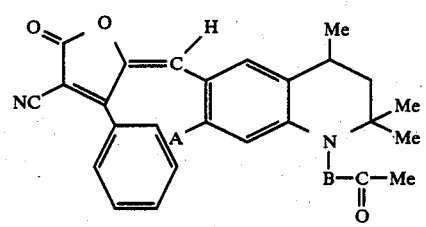

| ENTRY | A | B | COLOR |
|---|---|---|---|
| 1 | H | 20 | Violet |
| 2 | H | 27 | Violet |
| 3 | Me | 20 | Violet |
| 4 | Me | 15 | Violet |
| 5 | Cl | 12 | Violet |

EXAMPLE 12

The color strength of both the polymeric colorants and inks were determined by this method described in this example.

First the color value (a term used to represent color strength) of the concentrated polymeric colorant being tested was determined by weighing about 0.10 to 0.15 grams of the colorant into a 100 milliliter volumetric flask that was first tared with an analytical balance and then adding 40 to 50 milliliters of water. The flask was swirled until the colorant dissolved in the water, after which excess water was added to the 100 milliliter mark on the flask. The flask was stopped and the contents were mixed and shaken. Exactly 2 milliliters of the colorant solution in water was then added to a like flask and the second flask was filled with water to the 100 milliliter mark, stopped and shaken.

A Beckman DU-& spectrometer was zeroed with water in analyzing cell, and then filled with the test colorant solution prepared above. This solution was scanned from 300 to 700 nanometers. The maximum absorbance was recorded at the corresponding wavelength. The color value is obtained by multiplying the sample weight by 0.2 and then dividing this product into the maximum absorbance value.

$$CV(COLOR\ VALUE) = Absorbance/0.2 \times sample\ weight(grams)$$

Correcting for the color strength of the ink solution is done in order to obtain comparative data. In order to correct for the varying ink solutions a given weight of the uncut colorant was added to water and any additives needed in the ink solution. For the comparative work in this invention only water and glycerine were added to the colorant and the total solution added total solution weight was always kept constant at 25 grams. In addition, the amount of glycerine was always held constant at 3.75 grams per 25 grams of solution so that only the amount of uncut colorant and water would vary accordingly. Therefore, the desired color value could be adjusted by simply varying the amount of water added to the ink solution.

In order to correct for varying color strengths of the different colorants, the amount of colorant added was determined by the following formula:

$$Weight = (Desired\ ink\ color\ value/Measured\ color\ value) \times 25$$

where Weight is in grams of the uncut color
The amount of water needed for the ink solution was then determined by adding the uncut colorant weight (in grams) to 3.75 (glycerine weight) and subtracting this sum from 25 grams (total solution weight). The adjusted color values varied according to the ink color being evaluated. For example, red ink solutions were adjusted to 1.2 a color value concentration, while blue was adjusted to 7.5, orange to 4.5, violet to 1.5 and yellow to 4.0 color value concentrations.

EXAMPLE 13

The viscosity of the polymeric ink solutions was with a Brookfield Viscosimeter model LVT with UL adapter at constant temperature. A 16 milliliter sample of the polymeric ink solution was poured into the UL adaptor cylinder and placed in a constant temperature solution regulated at 25° C. The UL adaptor was attached to the viscosimeter which is set at a speed of 60 rpm and the viscosimeter was turned on. After 30 seconds a reading was recorded. The reading off of the viscosimeter was converted into centipoise units by multiplying a factor of 0.1.

EXAMPLE 14

This example describes the procedure used to stain fabric with polymeric ink solutions used for comparative testing in this invention. Number 419 woven 100% cotton 2.94 combed broadcloth (from TestFabrics, Incorporated) with the dimensions measuring 133 inches by 63 inches is prewashed, dried, and ironed according to ASTMD 4265. This prepared fabric is then cut into test sections with dimensions measuring 6 inches by 7 inches (7 inches in the direction) and maintaining the face section direction using the on center 36 inches section of the fabric sheet. The polymeric ink solution (as prepared in example 12) was applied to the test fabric above according to the following procedure. A piece of the 100% cotton woven broadcloth is loosely mounted in a 5 inch diameter embroidery hoop and centered over a 500 milliliter beaker. Using a one milliliter syringe with needle, 6.6 milliliters of the test solution was loaded. The polymeric ink solution was then deposited dropwise on the fabric in a 6 centimeter diameter circle. This was done by starting at the outside of the circle and placing the drops approximately 1 centimeter apart (working in a circular trend toward the center). Care was taken so that no drops of the ink solution were placed on top of each other. The surface of the stained area is then immediately rubbed with a plastic disposo pipet in the vertical and horizontal directions to insure a uniform deposit of colorant over the surface inside the 6 centimeter diameter circle. This stain is air dried at room temperature for four hours.

EXAMPLE 15

The procedure for laundering test fabrics stained with ink solutions for comparative data is described in this example.

Begin filling a washing machine (as designated in ASTM D4265) with 105F water, at settings of 12 minutes, normal wash cycle, maximum water level, and cold water rinse. Add 100 grams to Tide (by Proctor and Gamble) detergent to the washer. Allow the detergent to dissolve while the machine is filling.

Place the dried individual stained test fabric sample into a two liter beaker which has water flowing in (at about 105F). Allow the water to run continuously while hand-agitating the test sample for approximately 10 seconds. Empty the beaker, then place the sample fabric back into the beaker under running water. Repeat this procedure two additional times for a total of 30 seconds of rinsing. At the end of this rinse procedure the water in the beaker should be clear of all ink colorant.

The excess water is then hand squeezed from the sample and the sample is fastened to the edge of a dry towel so that the stained area extends out away from the towel (only a maximum of 10 samples should be evaluated per washing load). When the machine is filled and the agitation cycle begins, place the towel with the attached sample into the washing machine. In addition, a sufficient amount of dummy load (other fabric) is placed in the washer to provide a total of about four pounds of washing load (this includes the sample and load).

At the completion of the washing cycle, transfer the load to a dryer set at normal dry for 40 minutes. After the drying cycle, detach the test sample from the towel and smooth the fabric samples with a steam iron (setting with steam). The samples are now ready for further stain measurements.

EXAMPLE 16

This example describes the method used to evaluate and compare the residual fabric staining caused by ink solutions after the laundering procedure described in Example 14.

The test fabric was analyzed using CIELAB coordinates measured by means of a Labscan colorimeter. The colorimeter was adjusted to the following settings:
- 10 degree viewer
- D65 illuminant
- ¼ inch diameter viewing aperture
- UV filter The instrument was then calibrated to zero reflectance with a black tile and 100% reflectance with a white tile. Both the control (white fabric) and the stained test sample were evaluated according to the following procedure. The fabric test sample was folded lengthwise and widthwise to present a four fold thickness of fabric to be inserted into the light source of the instrument. A white tile was then placed over the fabric sample and the CIELAB data was obtained from the colorimeter. The color difference ( E*ab) of each test sample stain was calculated according to the following equation:

$$E^*ab = (L^*)^2 = (a^*)^2 = (b^*)^2$$

where delta E*ab represents the difference in color between the standard fabric and stained test fabric and the delta L*, delta a*, and delta b* terms are the color coordinates. The delta L* term represents the lightness of the color(stain), the delta a* term represents the redness or greenness of the stain, and the delta b* term represents the yellowness or blueness of the stain. For a further discussion see *Principles of Color Technology*, second Ed., F. W. Bullmeyer and M. Saltzmann, pages 59 through 60 and 102 through 104.

EXAMPLE 17

This example describes the manufacture of washable marking pens which contain the polymeric colorant compositions of this invention.

The washable polymeric ink markers are typically prepared according to the following procedure. First a polymeric ink solution is made from the colorant, humectant, biocide, water, and any other additive that is needed for a specific application. The percent of colorant or additive used in this ink solution can vary according to the desired properties of final ink such as color viscosity and shelf-life.

As a typical example, an orange polymeric ink solution (as set forth in entry 1 of Table VI) is prepared by weighing out the following components on an analytical balance into a tared 200 milliliter beaker:
- 30 grams of orange polymeric colorant
- 15 grams of glycerine
- 0.125 grams of Nuosept 95
- 54 grams of deionized water The beaker is then transferred to a hot plate, a magnetic stir bar is added and the solution is stirred until homogeneous.

Once the ink solution is obtained, the washable marker is manufactured according to the following procedure. A marker nib (manufactured by Porex Technologies of Fairburn, Ga.) was attached to the end of a pen barrel by insertion of a wire through the barrel and nib end. Approximately three milliliters of ink solution (prepared as described above) were slowly injected into the pen filter. The filter was then placed in the pen barrel and an endcap was attached to both ends of the marker. The completely manufactured marker was then placed with the nib end down for five minutes to allow the ink solution to flow throughout the nib. The marking pen is now ready for testing washability as described in Example 15.

EXAMPLE 18

This example describes the procedure for measuring the hand staining caused by ink solutions being compared and evaluated in this invention.

The hand staining test for ink solution being compared is performed according to the procedure. The subject first washes their hands with Ivory Liquid (by Proctor and Gamble) hand soap and dries them thoroughly. With a marking pen (as prepared in Example 17), mark the center of the hand palm with a ¼ inch strip of ink solution using the widest flat side of the marker nib. Repeat this procedure for a total of two additional times. The ink stain is now allowed to air dry for five minutes. The palm is then washed with water and Ivory liquid handsoap. The hand is thoroughly dried and residual skin stain is rated on a scale of 0 to 10. The following guidelines below are used to give a numerical value to an ink hand stain:
- 0—No stain apparent on hand
- 1—Sight stain apparent, approximately 10% depth of original
- 2—Sight stain apparent, approximately 20% depth of original
- 3—Moderate stain, approximately 30% depth of original stain
- 4—Moderate stain, approximately 40% depth of original stain
- 5—Moderate to severe stain, approximately 50% depth of original
- 6—Moderate to severe stain, approximately 60% depth of original
- 7—Severe stain, approximately 70% depth of original stain
- 8—Severe stain, approximately 80% depth of original stain
- 9—Severe stain, approximately 90% depth of original stain
- 10—100% of original stain remaining

EXAMPLE 19

This example provides stain data for ink compositions of commercially available washable markers.

Some typical existing commercial washable inks markets under the name of "Maxi Broad Tip Markers" were evaluated for staining according to the procedure given in examples of this invention and by the following procedure. A piece of 100% woven cotton broadcloth (from TestFabrics Incorporated as described in Example 14) was placed on a 6 inch by 7 inch plastic sheet which in turn was placed on a top loading analytical balance. The balance was then zeroed and the filter was removed from the pen body of and placed lengthwise in the center of the cotton fabric swatch. The fabric and plastic holder were removed from the balance and pressure was applied to allow ink from the filter to be absorbed by the fabric substrate. The filter was rolled over an area approximately 3 inches by 4 inches located in the center of the fabric until 0.6 to 0.7 grams of ink is absorbed on the fabric (the fabric and plastic are periodically weighed on the balance). The fabric ink stain is allowed to dry at room temperature for 4 hours. This procedure was repeated so that a stain is placed on different pieces of cotton fabric with red, violet and blue inks with "Maxi Broad Tip Markers."

The results of this table (entries 1–3) illustrates typical washability ink compositions being sold in the marketplace as washable inks. This data is intended as a reference point for comparing some of the polymeric methine ink compositions described in Examples 20 and 21.

TABLE 12

STAIN DATA FOR COMMERCIAL WASHABLE MARKING PENS

| ENTRY | COLOR | DELTA E*ab DATA | HAND STAINING DATA |
|---|---|---|---|
| 1 | Max-Blue | 46.60 | 7.0 |
| 2 | Maxi-Red* | 4.90 | 4.0 |
| 3 | Maxi-Violet* | 51.00 | 8.0 |

*Maxi Broad Tip Markers are manufactured commercially by Lovett Corporation of Needham, Maine

EXAMPLE 20

Some of the methane polymeric colorants prepared according to Example 1 (Table I) afterward were made into ink compositions as described in Example 12. The viscosity and stain data of the polymeric inks solutions was then determined according to Examples 13 through 18. These are all yellow colorants and were evaluated at a color value of 4.0 and are examples of the colorants this invention. The results are summarized in Table 13 below.

The results of Table 13 clearly show that an optimum molecular weight or number of ethylene oxide units are required for a practical ink viscosity and washable characteristics. The best inks results for the acetate terminated methine polymeric colorants having 10 to 27 EO units (entries 3 and 7 through 12).

Above this narrow range of EO units both the viscosity and staining properties were quite unsatisfactory for these corresponding polymeric colorants For example, the colorant in entry 13 at high molecular weight with 90 EO units and terminated with acetate could not be made into an ink solution because the ink composition solidified on cooling to room temperature. In addition, entries 1-2 and 5-6 (10 or 20 EO units) of this demonstrate the benefit of having the acetate groups present. None of these polymeric methine colorants contain the acetate termination and give unacceptable values for staining or viscosity. The hand staining is as much as 40% higher and fabric staining is as much as about fifteen times as much. In addition, the viscosity of entry 5 (20 EO units) is about five times higher than most of the usual values of the other methine polymeric 20 EO colorants terminated with acetate groups (entries 7-11).

In addition, the methine colorants illustrated in this table also give superior staining properties over the commercial washable markers shown in Table XII of Example 19. The hand staining of the commercial washable colorants is as much as 40% to 80% higher than the methine colorants in this table. The fabric staining is from three to twenty-five times worse for the commercial washable markers.

TABLE XIII

WASHABLE POLYMERIC METHINE COLORANT INK COMPOSITION DATA

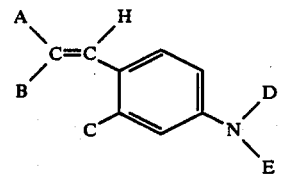

| ENTRY | A | B | C | D | E | V (cps) | Delta E*ab | HS |
|---|---|---|---|---|---|---|---|---|
| 1 | CN | CN | H | 10 | EO | 2.07 | 11.8 | 2 |
| 2 | CN | CO$_2$Et | H | 10 | EO | 2.27 | 33.3 | 6 |
| 3 | CN | CN | Cl | 10 | DA | 2.09 | 2.83 | 1 |
| 4 | CN | CO$_2$Et | H | 10 | DA | | PHASED | |
| 5 | CN | CN | H | 20 | EO | 11.46 | 16.3 | 0 |
| 6 | CN | CO$_2$Et | H | 20 | EO | 2.66 | 17.2 | 0 |
| 7 | CN | CN | H | 20 | EO DA | 2.68 | 3.30 | 1 |
| 8 | CN | CO$_2$Et | H | 20 | EO DA | 2.89 | 1.91 | 0 |
| 9 | CN | CO$_2$Me | H | 20 | EO DA | 2.89 | 1.91 | 0 |
| 10 | CN | CO$_2$Et | Cl | 20 | EO DA | 2.45 | 2.55 | 1 |
| 11 | CN | CO$_2$Et | Me | 20 | EO DA | 3.42 | 5.19 | 0 |
| 12 | CN | CN | H | 27 | EO DA | 3.46 | 3.22 | 0 |
| 13 | CN | CO$_2$Et | H | 90 | EO DA | * | * | * |

*Solidified on cooling to room temperature

EXAMPLE 21

In a like fashion methine polymeric colorants containing acetate terminations and different molecular structures were prepared according to Examples 5 and 7 through 10 and afterward were made into ink compositions as described in Example 12.

The viscosity and stain data of these methine polymeric ink solutions was determined according to Examples 13 through 18. All of the orange colorants were evaluated at a color value of 4.5 while the red were 1.2 and violet were 1.5 for the corresponding ink compositions containing different types of methines polymeric colorants of this invention. The results of Table XIV further serve to illustrate the utility for yet another different type of estered terminated methine polymeric colorants. All the methine polymeric colorants gave satisfactory viscosity and stain results in a molecular weight range or EO unit range (about 20 EO units) terminated with diacetate that were very similar to the polymeric colorants containing different chromophores in Example 20 (Table XIII).

In addition, these methines gave generally better washability properties than the commercial markers of Example 19. The hand staining was from 30 to about 70% better while the fabric staining was as much as ten times better for the methine polymeric colorants of this Table.

TABLE XIV
WASHABLE POLYMERIC METHINE INK COMPOSITION DATA

| ENTRY | A (STRUCTURE) | B | V(cps) | Delta E*ab | HS | COLOR |
|---|---|---|---|---|---|---|
| 1 | NC-C(CN)-C(C₆H₅)=CH-CH=CH- | H | 1.83 | 6.46 | 0 | Red |
| 2 | NC-C(CN)-C(thienyl)=CH-CH=CH- | H | 1.79 | 6.68 | 0 | Red |
| 3 | (cyano-phenyl furanone)=CH- | H | 1.89 | 8.60 | 1 | Violet |
| 4 | (phenyl-methyl pyrazolone)=CH- | Me | 6.83 | 8.20 | 0 | Orange |
| 5 | (indandione)=CH- | H | 3.09 | 5.01 | 0 | Orange |
| 6 | (phenyl-methyl pyrazolone)=CH- | H | 4.46 | 4.92 | 0 | Orange |

What is claimed is:

1. A water soluble, ester-terminated, poly(alkyleneoxy)-substituted methine colorant of the formula:

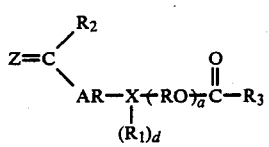

wherein: AR is an unsubstituted or substituted aromatic or hetero-aromatic group; X is selected from nitrogen or oxygen; R is unsubstituted or substituted straight or branched alkylene of 2–4 carbons or mixtures thereof; R₁ is selected from or an unsubstituted or substituted alkyl, cycloalkyl or phenyl moiety containing one to about 10 carbons, or a group of the formula:

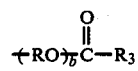

wherein R₃ is or alkyl of one to about ten carbons, and d is zero when X is oxygen and one when X is nitrogen; R₂ is hydrogen or alkyl of one to about five carbons; a and b are each an integer independently selected from one to about forty wherein a+b is an integer of from about 6 to about 80, and z is a divalent vinylic carbon atom which is covalently bonded to a group or moiety selected from cyano, vinyl carbon, sulfide, sulfoxide, sulfone, allylic oxygen, thiocyano, or carbonyl which is not part of an amide, carboxylic acid or carboxylic acid salt moiety.

2. A methine colorant of claim 1 wherein X is nitrogen.

3. A methine colorant of claim 1 wherein X is oxygen.

4. A methine colorant as defined in claim 1 having the formula:

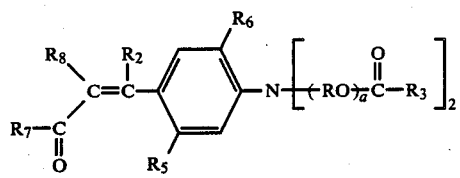

wherein: $R_5$ and $R_6$ are each selected from hydrogen, alkyl, alkoxy, halogen or trifluoromethyl; $R_8$ is selected from cyano, alkylsulfonyl, cycloalkylsulfonyl, arylsulfonyl, or lower carbalkoxy containing one to about ten carbons, acetyl or benzoyl; and $R_7$ is selected from alkyl, cycloalkyl or unsubstituted or substituted phenyl.

5. A methine colorant as defined in claim 1 having the formula:

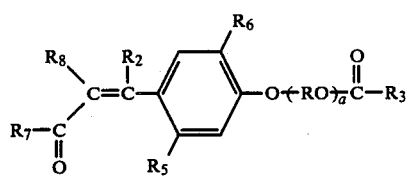

wherein: $R_5$ and $R_6$ are each selected from hydrogen, alkyl, alkoxy, halogen or trifluoromethyl; $R_8$ is selected from cyano, alkylsulfonyl, cycloalkylsulfonyl, arylsulfonyl, or lower carbalkoxy containing one to about ten carbons, acetyl or benzoyl; and $R_7$ is selected from alkyl, cycloalkyl or unsubstituted or substituted phenyl.

6. A methine colorant as defined in claim 1 having the formula:

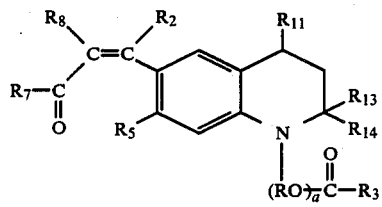

wherein: $R_5$ is selected from alkyl, alkoxy, halogen or trifluoromethyl; $R_7$ is selected from alkyl, cycloalkyl or unsubstituted or substituted phenyl; $R_8$ is selected from cyano, alkylsulfonyl, cycloalkylsulfonyl, arylsulfonyl, or lower carbalkoxy containing from one to about ten carbons, acetyl or benzoyl; and $R_{11}$, $R_{13}$ and $R_{14}$ are each selected from or lower alkyl.

7. A methine colorant as defined in claim 1 having the formula:

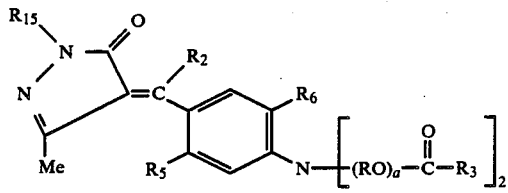

wherein: $R_5$ and $R_6$ are each selected from H, alkyl, alkoxy, halogen or trifluoromethyl; and $R_{15}$ is selected from H, lower alkyl, phenyl or phenyl substituted with lower alkyl, lower alkoxy or halogen.

8. A methine colorant as defined in claim 1 having the formula:

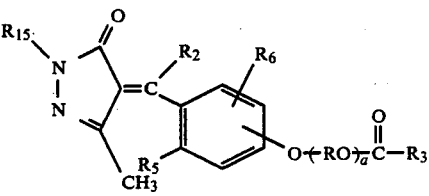

wherein; $R_5$ and $R_6$ are each selected from H, alkyl, alkoxy, halogen or trifluoromethyl; and $R_{15}$ is selected from H, lower alkyl, phenyl or phenyl substituted with lower alkyl lower alkoxy or halogen.

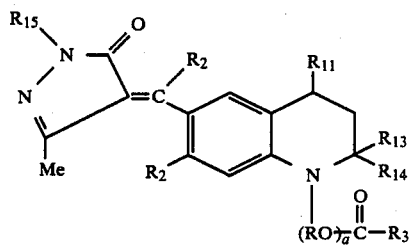

9. A methine colorant as defined in claim 1 having the formula:

wherein: $R_{11}$, $R_{13}$ and $R_{14}$ are each selected from or lower alkyl; and $R_{15}$ is selected from H, lower alkyl, phenyl or phenyl substituted with lower alkyl, lower alkoxy or halogen.

10. A methine colorant as defined in claim 1 having the formula:

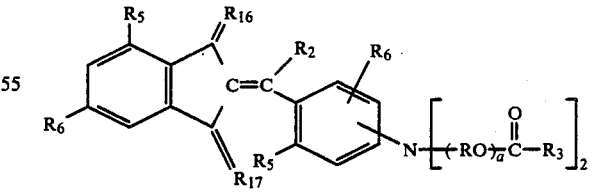

wherein: $R_5$ and $R_6$ are each selected from H, alkyl, alkoxy, halogen, or trifluoromethyl; and $R_{16}$ and $R_{17}$ are each selected from oxygen or $CR_8R_8$ wherein each $R_8$ is selected from cyano, alkylsulfonyl, cycloalkylsulfonyl, arylsulfonyl, or lower carbalkoxy containing from one to about ten carbons, acetyl or benzoyl.

11. A methine colorant as defined in claim 1 having the formula:

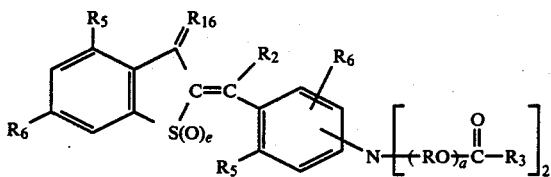

wherein: e is zero, one or two; each $R_5$ and $R_6$ is selected from H, alkyl, alkoxy, halogen, or trifluoromethyl; and $R_{16}$ is selected from oxygen or $CR_8R_8$ wherein each $R_8$ is selected from cyano, alkylsulfonyl, cycloalkylsulfonyl, arylsulfonyl, or lower carbalkoxy containing from one to about ten carbons, acetyl or benzoyl.

12. A methine colorant as defined in claim 1 having the formula:

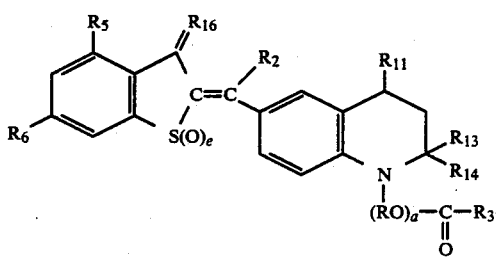

wherein: $R_5$ and $R_6$ are each selected from H, alkyl, alkoxy, halogen, or trifluoromethyl; $R_{11}$, $R_{13}$ and $R_{14}$ are each selected from or lower alkyl; e is 0, 1 or 2; and $R_{16}$ is selected from oxygen or $CR_8R_8$ wherein each $R_8$ is selected from cyano, alkylsulfonyl, cycloalkylsulfonyl, arylsulfonyl, or lower carbalkoxy containing from one to about ten carbons, acetyl or benzoyl.

13. A methine colorant as defined in claim 1 having the formula:

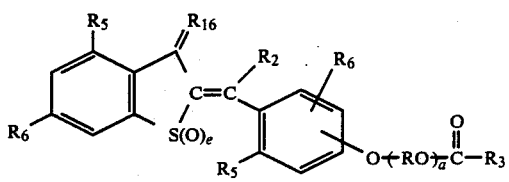

wherein: each $R_5$ and $R_6$ is selected from H, alkyl, alkoxy, halogen, or trifluoromethyl; e is 1, 2 or 3; and $R_{16}$ is selected from oxygen or $CR_8R_8$ wherein each $R_8$ is selected from cyano, alkylsulfonyl, cycloalkyl-sulfonyl, arylsulfonyl, or lower carbalkoxy containing from one to about ten carbons, acetyl or benzoyl.

14. A methine colorant as defined in claim 1 having the formula:

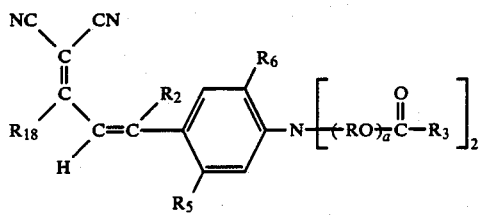

wherein: each of $R_5$ and $R_6$ is selected from H, alkyl alkoxy, halogen, or trifluoromethyl; and $R_{18}$ is phenyl, beta-naphthyl, alpha-naphthyl, thiophenyl, or halothiophenyl.

15. A methine colorant as defined in claim 1 having the formula:

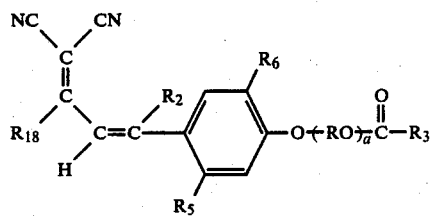

wherein: each of $R_5$ and $R_6$ is selected from H, alkyl, alkoxy, halogen or trifluoromethyl; and $R_{18}$ is phenyl, beta-naphthyl, alpha-naphthyl, thiophenyl, or halothiophenyl.

16. A methine colorant as defined in claim 1 having the formula

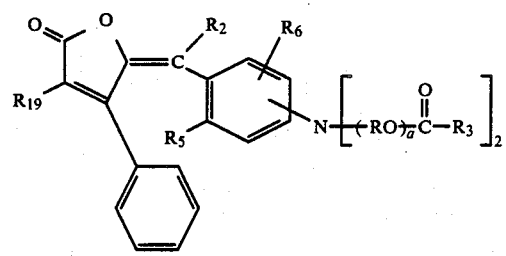

wherein: each of $R_5$ and $R_6$ is selected from H, alkyl, alkoxy, halogen, or trifluoromethyl; and $R_{19}$ is cyano, or lower carbalkoxy containing one to about 10 carbons.

17. A methine colorant as defined in claim 1 having the formula:

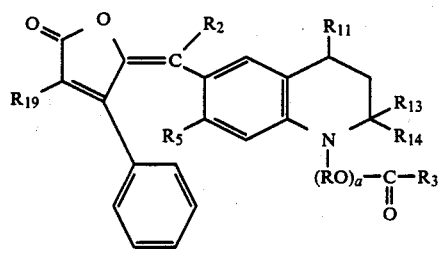

wherein: $R_5$ is selected from H, alkyl, alkoxy, halogen, or trifluoromethyl; $R_{11}$ $R_{13}$ and $R_{14}$ are each selected from or lower alkyl; and $R_{19}$ is cyano or lower carbalkoxy containing one to about ten carbons.

18. A methine colorant as defined in claim 1 having the formula:

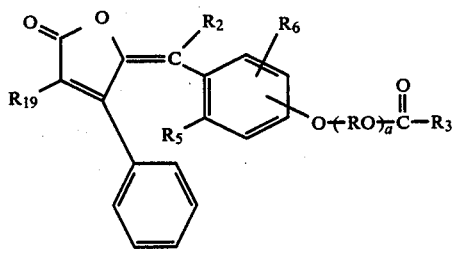

wherein; each of $R_5$ and $R_6$ is selected from H, alkyl, alkoxy, halogen, or trifluoromethyl; and $R_{19}$ is cyano or lower carbalkoxy containing one to about ten carbons.

19. A washable ink composition which comprises an aqueous mixture of water soluble, ester-terminated, poly(alkyleneoxy)-substituted methine colorant of the formula:

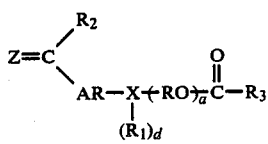

wherein: AR is an unsubstituted or substituted aromatic or hetero-aromatic group; X is selected from nitrogen or oxygen; R is unsubstituted or substituted straight or branched alkylene of 2–4 carbons or mixtures thereof; $R_1$ is selected from or an unsubstituted or substituted alkyl, cycloalkyl or phenyl moiety containing one to about 10 carbons, or a group of the formula:

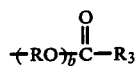

wherein $R_3$ is H or alkyl of one to about ten carbons, and d is zero when X is oxygen and one when X is nitrogen; $R_2$ is hydrogen or alkyl of one to about five carbons; a and b are each an integer independently selected from one to about forty wherein a+b is an integer of from about 6 to about 80; and Z is a divalent vinylic carbon atom which is covalently bonded to a # group or moiety selected from cyano, vinyl carbon, sulfide, sulfoxide, sulfone, allylic oxygen, thiocyano, or carbonyl which is not part of an amide, carboxylic acid or carboxylic acid salt moiety.

20. A composition as defined in claim 19 wherein X is nitrogen.

21. A composition as defined in claim 1 wherein X is oxygen.

22. A composition as defined in claim 19 wherein the colorant has the formula:

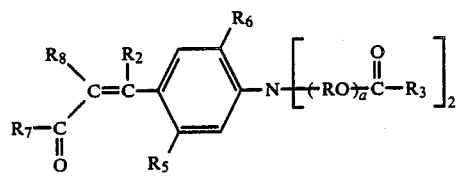

wherein: $R_5$ and $R_6$ are each selected from hydrogen, alkyl, alkoxy, halogen, or trifluoromethyl; $R_8$ is selected from cyano, alkylsulfonyl, cycloalkylsulfonyl, arylsulfonyl, or lower carbalkoxy containing one to about ten carbons, acetyl or benzoyl; and $R_7$ is selected from alkyl, cycloalkyl or unsubstituted or substituted phenyl.

23. A composition as defined in claim 19 wherein the colorant has the formula:

24. A composition as defined in claim 19 wherein the colorant has the formula:

25. A composition as defined in claim 19 wherein the colorant has the formula:

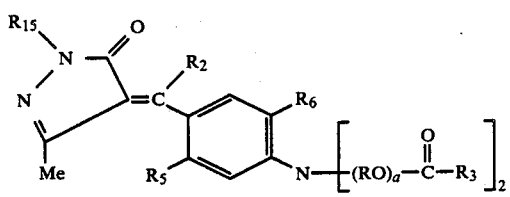

wherein: $R_5$ and $R_6$ are each selected from H, alkyl, alkoxy, halogen or trifluoromethyl; and $R_{15}$ is selected from H, lower alkyl, phenyl or phenyl substituted with lower alkyl, lower alkoxy or halogen.

26. A composition as defined in claim 19 wherein the colorant has the formula:

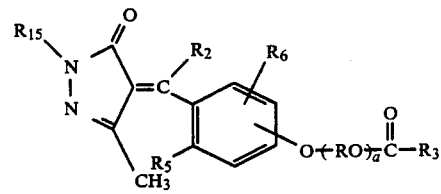

wherein: $R_5$ and $R_6$ are each selected from H, alkyl, alkoxy, halogen or trifluoromethyl; and $R_{15}$ is selected from H, lower alkyl, phenyl or phenyl substituted with lower alkyl, lower alkoxy or halogen.

27. A composition as defined in claim 19 wherein the colorant has the formula:

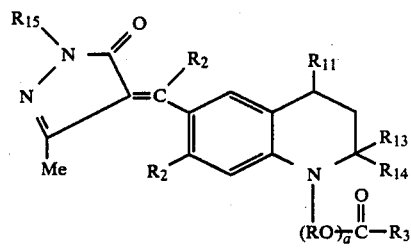

to wherein: $R_{11}$, $R_{13}$ and $R_{14}$ are each selected from or lower alkyl; and $R_{15}$ is selected from H, lower alkyl, phenyl or phenyl substituted with lower alkyl, lower alkoxy or halogen.

28. A composition as defined in claim 19 wherein the colorant has the formula:

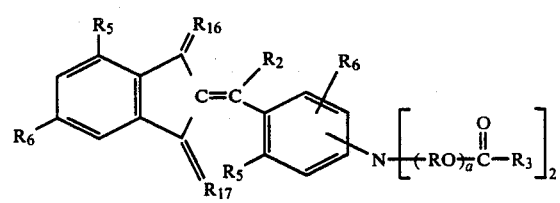

wherein: $R_5$ and $R_6$ are each selected from H, alkyl, alkoxy, halogen, or trifluoromethyl; and $R_{16}$ and $R_{17}$ are each selected from oxygen or $CR_8R_8$ wherein each $R_8$ is selected from cyano, alkylsulfonyl, cycloalkylsulfonyl arylsulfonyl, or lower carbalkoxy containing from one to about ten carbons acetyl or benzoyl.

29. A composition defined in claim 19 wherein the colorant has the formula:

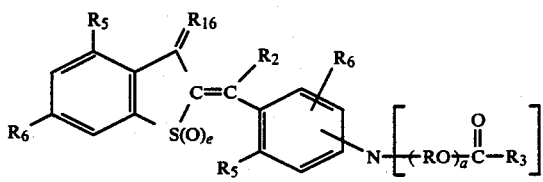

wherein: e is zero, one or two; each $R_5$ and $R_6$ is selected from H, alkyl, alkoxy, halogen, or trifluoromethyl; and $R_{16}$ is selected from oxygen or $CR_8R_8$ wherein each $R_8$ is selected from cyano, alkylsulfonyl, cycloalkylsulfonyl, arylsulfonyl, or lower carbalkoxy containing from one to about ten carbons, acetyl or benzoyl.

30. A composition as defined in claim 19 wherein the colorant has the formula:

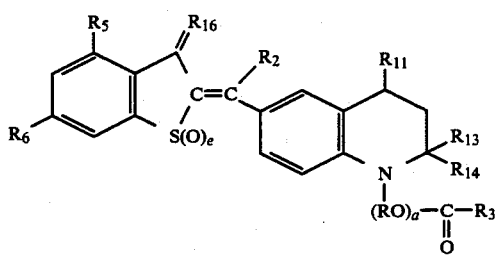

wherein: $R_5$ and $R_6$ are each selected from H, alkyl, alkoxy, halogen, or trifluoromethyl; $R_{11}$, $R_{13}$ and $R_{14}$ are each selected from or lower alkyl; e is 0, 1 or 2; and $R_{16}$ is selected from oxygen or $CR_8R_8$ wherein each $R_8$ is selected from cyano, alkylsulfonyl, cycloalkylsulfonyl, arylsulfonyl, or lower carbalkoxy containing from one to about ten carbons, acetyl or benzoyl.

31. A composition as defined in claim 19 wherein the colorant has the formula:

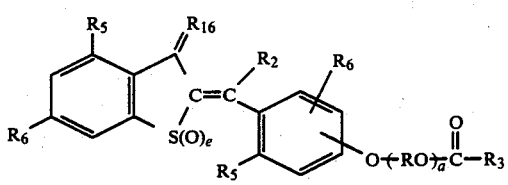

wherein: each $R_5$ and $R_6$ is selected form H, alkyl, alkoxy, halogen, or trifluoromethyl; e is 1, 2 or 3; and $R_{16}$ is selected from oxygen or $Cr_8r_8$ wherein each $R_8$ is selected from cyano, alkylsulfonyl, cycloalkyl-sulfonyl arylsulfonyl, or lower carbalkoxy containing from one to about ten carbons, acetyl or benzoyl.

32. A composition as defined in claim 19 wherein the colorant has the formula:

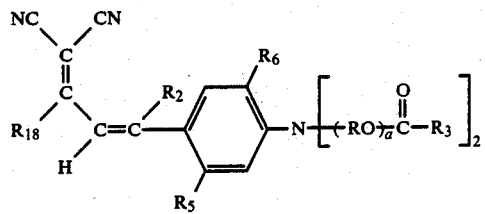

wherein: each of $R_5$ and $R_6$ is selected from H, alkyl, alkoxy, halogen, or trifluoromethyl; and $R_{18}$ is phenyl, beta-naphthyl, alpha-naphthyl, thiophenyl, or halothiophenyl.

33. A composition defined in claim 19 wherein the colorant has the formula:

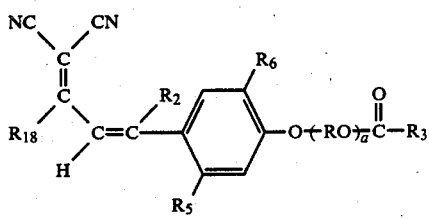

wherein: each of $R_5$ and $R_6$ is selected from H, alkyl, alkoxy, halogen or trifluoromethyl; and $R_{18}$ is phenyl, beta-naphthyl, alpha-naphthyl, thiophenyl, or halothiophenyl.

34. A composition as defined in claim 19 wherein the colorant has the formula:

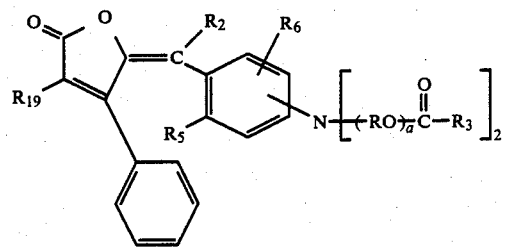

wherein: each of $R_5$ and $R_6$ is selected from H, alkyl, alkoxy, halogen, or trifluoromethyl; and $R_{19}$ is cyano, or lower carbalkoxy containing one to about ten carbons.

35. A composition as defined in claim 19 wherein the colorant has the formula:

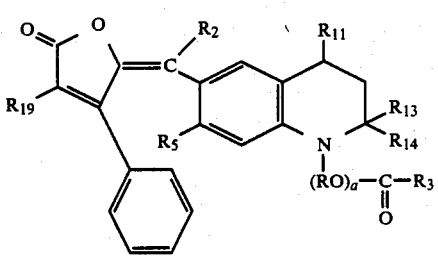

wherein: $R_5$ is selected from H, alkyl, alkoxy, halogen, or trifluoromethyl; $R_{11}$, $R_{13}$ and $R_{14}$ are each selected from H or lower alkyl; and $R_{19}$ is cyano or lower carbalkoxy containing one to about ten carbons.

36. A composition as defined in claim 19 wherein the colorant has the formula:
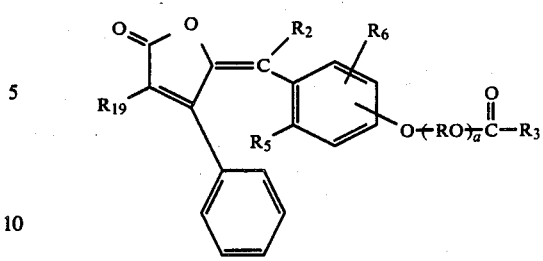
wherein: each of $R_5$ and $R_6$ is selected from H, alkyl, alkoxy, halogen, or trifluoromethyl; and $R_{19}$ is cyano or lower carbalkoxy containing one to about ten carbons.
* * * * *